(12) United States Patent
Braun et al.

(10) Patent No.: US 12,147,213 B2
(45) Date of Patent: Nov. 19, 2024

(54) EMPLOYING SINGLE PAIR ETHERNET FOR ZONED SAFETY IN DRIVE APPLICATIONS

(71) Applicant: Rockwell Automation Technologies, Inc., Mayfield Heights, OH (US)

(72) Inventors: Scott D. Braun, Menomonee Falls, WI (US); Roberto S. Marques, Cedarburg, WI (US); Marius G. Chis, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 557 days.

(21) Appl. No.: 17/484,948

(22) Filed: Sep. 24, 2021

(65) Prior Publication Data

US 2023/0093802 A1    Mar. 30, 2023

(51) Int. Cl.
*H01H 47/00*    (2006.01)
*G05B 19/406*    (2006.01)

(52) U.S. Cl.
CPC ......... *G05B 19/406* (2013.01); *H01H 47/002* (2013.01); *G05B 2219/34465* (2013.01)

(58) Field of Classification Search
CPC . H01H 47/002; G06F 11/2076; G06F 11/108; G06F 11/1469; G06F 11/0727; G06F 3/065; G06F 3/067; G06F 3/0619; G06F 3/0604; G06F 3/0647; G06F 3/0611; G06F 3/0605; G06F 3/061; G06F 3/0632
See application file for complete search history.

(56) References Cited

U.S. PATENT DOCUMENTS 7,082,485 B2    7/2006    Ellerbrock et al.
7,558,846 B2    7/2009    Gu
(Continued)

FOREIGN PATENT DOCUMENTS

EP    1770738 A2    4/2007
EP    3879365 A2    9/2021
(Continued)

OTHER PUBLICATIONS

Extended European Search Report for Application No. 22195581.8 mailed Feb. 3, 2023, 7 pages.
(Continued)

*Primary Examiner* — Bryan R Perez
(74) *Attorney, Agent, or Firm* — Fletcher Yoder, P.C.

(57) ABSTRACT

A system may include one or more drives configured to receive a first alternative current (AC) voltage from a power source and provide a second AC voltage to one or more load devices. The system may further include one or more safety relay devices configured to couple the power source to the one or more drives and a communication device, where the communication device includes a processor. The processor may be configured to receive a first dataset via an Ethernet communication protocol, where the first dataset may include safety connection data indicative of one or more safety commands for controlling one or more operations of the one or more safety relay devices. The processor may further be configured to transmit a second dataset to the one or more safety relay devices via a subnet infrastructure, where the second dataset includes the one or more safety commands.

18 Claims, 9 Drawing Sheets

(56) References Cited

U.S. PATENT DOCUMENTS

| | | |
|---|---|---|
| 7,660,889 B2 | 2/2010 | Gotesdyner |
| 7,949,721 B2 | 5/2011 | Burrow et al. |
| 8,359,397 B2 | 1/2013 | Traversat |
| 8,582,469 B2 | 11/2013 | Rosenberg |
| 8,931,101 B2 | 1/2015 | Saluda |
| 9,037,673 B2 | 5/2015 | Horr |
| 9,141,792 B2 | 9/2015 | Saluda |
| 9,143,944 B2 | 9/2015 | Gong |
| 9,294,562 B2 | 3/2016 | Gong |
| 9,696,704 B2 | 7/2017 | Xu et al. |
| 11,036,209 B2 | 6/2021 | Xu |
| 2005/0007964 A1 | 1/2005 | Falco |
| 2006/0047778 A1 | 3/2006 | Adams et al. |
| 2006/0224748 A1 | 10/2006 | Gupta |
| 2009/0254639 A1 | 10/2009 | Manchester |
| 2010/0064024 A1 | 3/2010 | Horr |
| 2010/0153771 A1 | 6/2010 | Gordon et al. |
| 2011/0087720 A1 | 4/2011 | De Azambuja et al. |
| 2014/0137246 A1 | 5/2014 | Saluda |
| 2014/0211345 A1* | 7/2014 | Thompson ............... H02H 3/33 335/11 |
| 2014/0325194 A1 | 10/2014 | Brindle |
| 2016/0050116 A1 | 2/2016 | Sheshadri |
| 2017/0078382 A1 | 3/2017 | Prakash et al. |
| 2018/0266626 A1 | 9/2018 | Machuletz et al. |
| 2019/0250910 A1 | 8/2019 | Yu |
| 2019/0342296 A1 | 11/2019 | Anandam |
| 2019/0342328 A1 | 11/2019 | Rivner |

FOREIGN PATENT DOCUMENTS

| | | |
|---|---|---|
| KR | 20100034395 A | 4/2010 |
| WO | 2018018820 A1 | 2/2018 |

OTHER PUBLICATIONS

Extended European Search Report for EP Application No. 20191255.7 mailed Apr. 16, 2021, 15 pages.

Partial European Search Report for EP Application No. 20191255.7 mailed Jan. 28, 2021, 14 pages.

Allen Bradley; "Controllogix Peer-to-Peer 1/0;" May 2012; 2 pages.

\* cited by examiner

EMPLOYING SINGLE PAIR ETHERNET FOR ZONED SAFETY IN DRIVE APPLICATIONS

CROSS-REFERENCE TO RELATED APPLICATIONS

This application is related to co-pending U.S. patent application Ser. No. 17/484,966, entitled "OPTION CARD FOR FACILITATING COMMUNICATION IN DRIVE APPLICATIONS," and co-pending U.S. patent application Ser. No. 17/484,900, entitled "MULTI-DRIVE USAGE BASED ON SINGLE PAIR ETHERNET," each of which are incorporated herein by reference for all purposes.

BACKGROUND

The present disclosure generally relates to implementing increased safety features into industrial drive applications and, more particularly, to implementing cost-efficient and zone-based safety features into the industrial drive applications using Single Pair Ethernet (SPE).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of prior art.

A growing number of drive applications request drives to be equipped with Safe Torque Off (STO) control. The STO control is used to prevent unexpected motor rotation in certain circumstances when the motor is expected to be offline, while the drive remains connected to the power supply. When STO control is activated, the torque power is disconnected from the drive, thus stopping and preventing any motor shaft rotation. Safety control for STO may be implemented in the drives using hardware connections and/or network connections. The use of hardware implemented safety control for STO involves additional cabling, installation costs, and product costs. Moreover, the use of network implemented safety control for STO may involve additional product cost for the safety processors and circuits, additional power per device, and higher network capabilities to support both Input/Output (I/O) and safety connections. As such, improved systems for sharing the cost of safety across devices connected via a network is desired.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include one or more drives configured to receive a first alternative current (AC) voltage from a power source and provide a second AC voltage to one or more load devices. The system may further include one or more safety relay devices configured to couple the power source to the one or more drives. The system may further include a communication device, where the communication device includes a processor. The processor may be configured to receive a first dataset via an Ethernet communication protocol, where the first dataset comprises safety connection data indicative of one or more safety commands for controlling one or more operations of the one or more safety relay devices. The processor may further be configured to transmit a second dataset to the one or more safety relay devices via a subnet infrastructure, where the second dataset comprises the one or more safety commands.

In another embodiment, a system may include one or more drives configured to receive a first alternative current (AC) voltage from a power source and provide a second AC voltage to one or more load devices. The system may further include one or more contactors configured to couple the power source to the one or more drives. The system may further include a communication device, where the communication device includes a processor. The processor may be configured to receive a first dataset via an Ethernet communication protocol, where the first dataset comprises safety connection data indicative of one or more safety commands for controlling one or more operations of the one or more contactors. The processor may further be configured to transmit a second dataset to the one or more contactors via a subnet infrastructure, where the second dataset comprises the one or more safety commands.

In a further embodiment, a system may include one or more drives configured to receive a first alternative current (AC) voltage from a power source and provide a second AC voltage to one or more load devices. The system may further include one or more contactors configured to couple the power source to the one or more drives. The system may further include one or more safety relay devices communicatively coupled to the one or more contactors configured to control the one or more contactors. The system may further include a network component, where the network component includes one or more modulators. The one or more modulators may be configured to receive a signal and generate a modulated signal by modulating the signal based on a status of a safety circuit. The one or more modulators may further be configured to transmit the modulated signal via a single-pair Ethernet (SPE) conductors. The system may further include a communication device, where the communication device includes a processor. The processor may be configured to receive a first dataset via an Ethernet communication protocol, where the first dataset comprises safety connection data indicative of one or more safety commands for controlling one or more operations of the one or more safety relay devices. The processor may further be configured to transmit a second dataset to the one or more safety relay devices via the SPE conductors, where the second dataset comprises the one or more safety commands.

DRAWINGS

These and other features, aspects, and advantages of the present disclosure will become better understood when the following detail description is read with reference to the accompanying drawings in which like characters represent like parts throughout the drawings, wherein.

DETAILED DESCRIPTION

Figure 1:
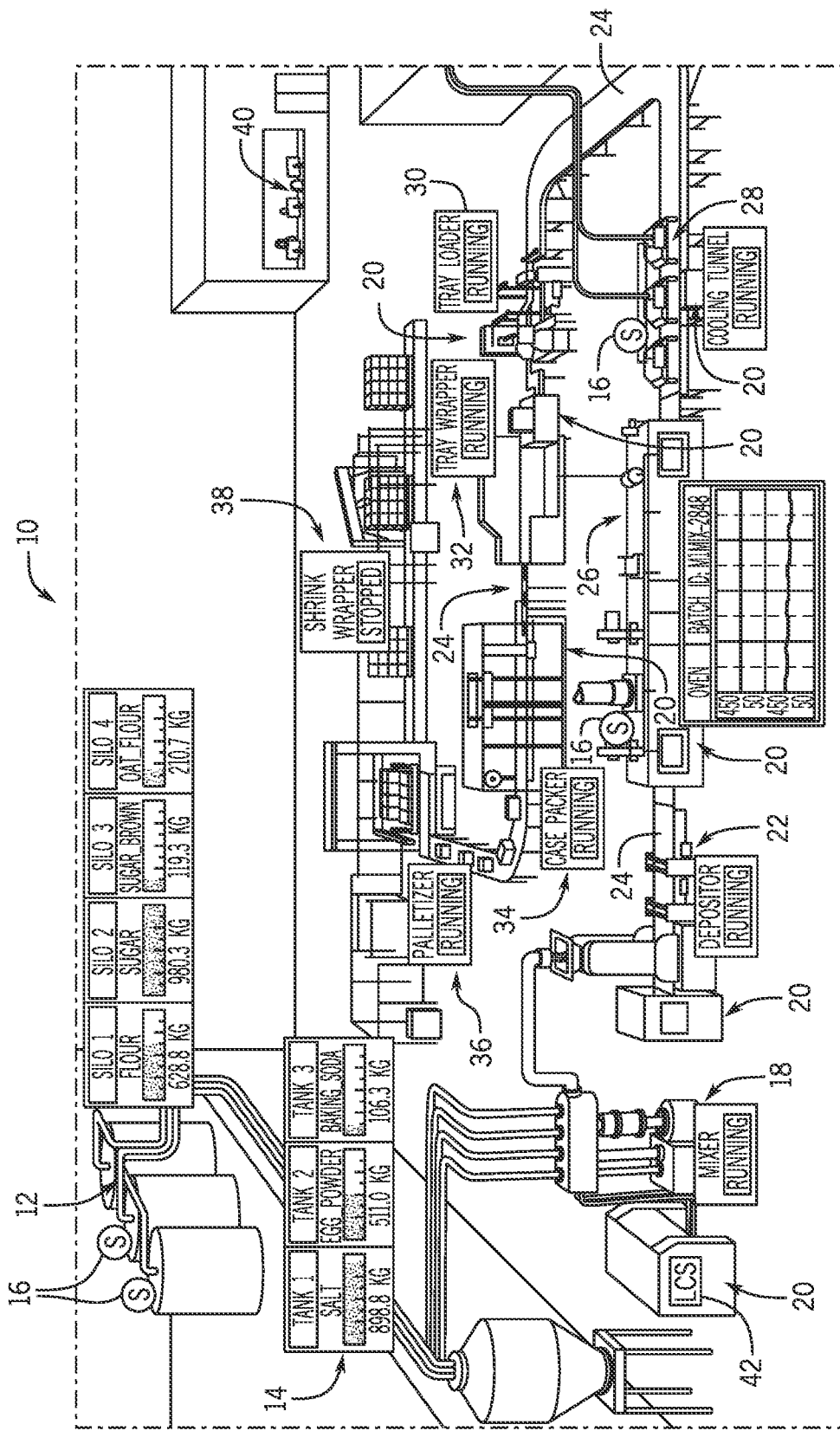
FIG. 1 illustrates an example industrial automation system employed by a food manufacturer, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a," "an," "the," and "said" are intended to mean that there are one or more of these elements. The terms "comprising," "including," and "having" are intended to be inclusive and mean that there may be additional elements other than the listed elements.

As discussed above, certain drive applications may request that some safety controls, such as Safe Torque Off (STO), be incorporated into the operations of the respective drives. STO control operations may include halting power output from drives connected to motors to prevent the motors from producing torque. In some embodiments, the STO control operation may be implemented through the drive's hardware components to ensure that the drive and motor components maintain fault tolerances. STO may be used as an auxiliary stop operation that will cause a shaft of the motor being powered by the drive to gradually coast to a stop. As such, the STO control operation is used to prevent unexpected motor rotation if there is a situation in which the drive remains connected to the power supply and the motor is expected to be stationary. Implementing these types of safety controls may involve incorporating hardware components into the drive resulting in an increasingly complex and costly industrial automation system. In some cases, the hardware components implementing the STO control operations may not natively fit into the existing industrial automation systems and thus may involve unorthodox solutions to enable the hardware components that provide the STO control operations to be incorporated into existing systems.

To remedy this, the embodiments described herein may include implementing network-based safety controls with drives to implement a network safety circuit and facilitate communication of the STO control operations without incorporating additional hardware components into the drive. In some cases, an industrial automation system may include certain network functionalities for communicating hardware I/O commands across a communication infrastructure that is connected to various components or devices that are part of the industrial automation system. With this in mind, in some embodiments, the communication infrastructure may be implemented using a Single Pair Ethernet (SPE) infrastructure for transmitting hardware I/O commands. That is, drive systems and other components that are part of the industrial automation system may be communicatively coupled to each other and other control systems via a network cable that includes a Single Pair Ethernet conductors. The SPE conductors may provide industrial settings with a lightweight, compact, and durable communication network capable of transmitting up to 10 Megabytes/second across 1,000 meters. Moreover, the SPE conductors may transmit safety connection information to implement safety features across the industrial automation system, such as implementing STO control operations.

By way of introduction, FIG. 1 illustrates an example industrial automation system 10 employed by a food manufacturer in which the present embodiments described herein may be implemented. It should be noted that although the example industrial automation system 10 of FIG. 1 is directed at a food manufacturer, the present embodiments described herein may be employed within any suitable industry, such as automotive, mining, hydrocarbon production, manufacturing, and the like. That is, the following brief description of the example industrial automation system 10 employed by the food manufacturer is provided herein to help facilitate a more comprehensive understanding of how the embodiments described herein may be applied to industrial devices to significantly improve the operations of the respective industrial automation system based on the current configuration of the equipment in the industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals and preservatives. In some embodiments, sensors 16 may be positioned within or around the silos 12, the tanks 14, or other suitable locations within the example industrial automation system 10 to measure certain properties, such as temperature, mass, volume, pressure, humidity, and the like.

The raw materials be provided to a mixer 18, which may mix the raw materials together according to a specified ratio. The mixer 18 and other machines in the example industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the example industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the example industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

The local control system 42 may have access to configuration data associated with the connected industrial automation devices 20. That is, the local control system 42 may include memory or a storage component that stores information concerning the configuration of each industrial automation device 20 connected to it. In some embodiments, the information or configuration data may be populated or input by an operator at the time the respective industrial automation device 20 is installed. Additionally, the local control system 42 may query the connected industrial automation device 20 to retrieve configuration data, such as model number, serial number, firmware revision, assembly profile, and the like. In some embodiments, the supervisory control system 40 may collect configuration data from multiple local control systems 40 and store the information in a suitable memory or storage component.

In some embodiments, the industrial automation devices 20 of the example industrial automation system 10 may include one or more drives to control one or more motors. Each drive may include a control system for controlling the one or more motors. In some embodiments, the local control system 42 may transmit command signals to one or more drive control systems, which, in turn, enables the movement of the one or more motors.

Figure 2:
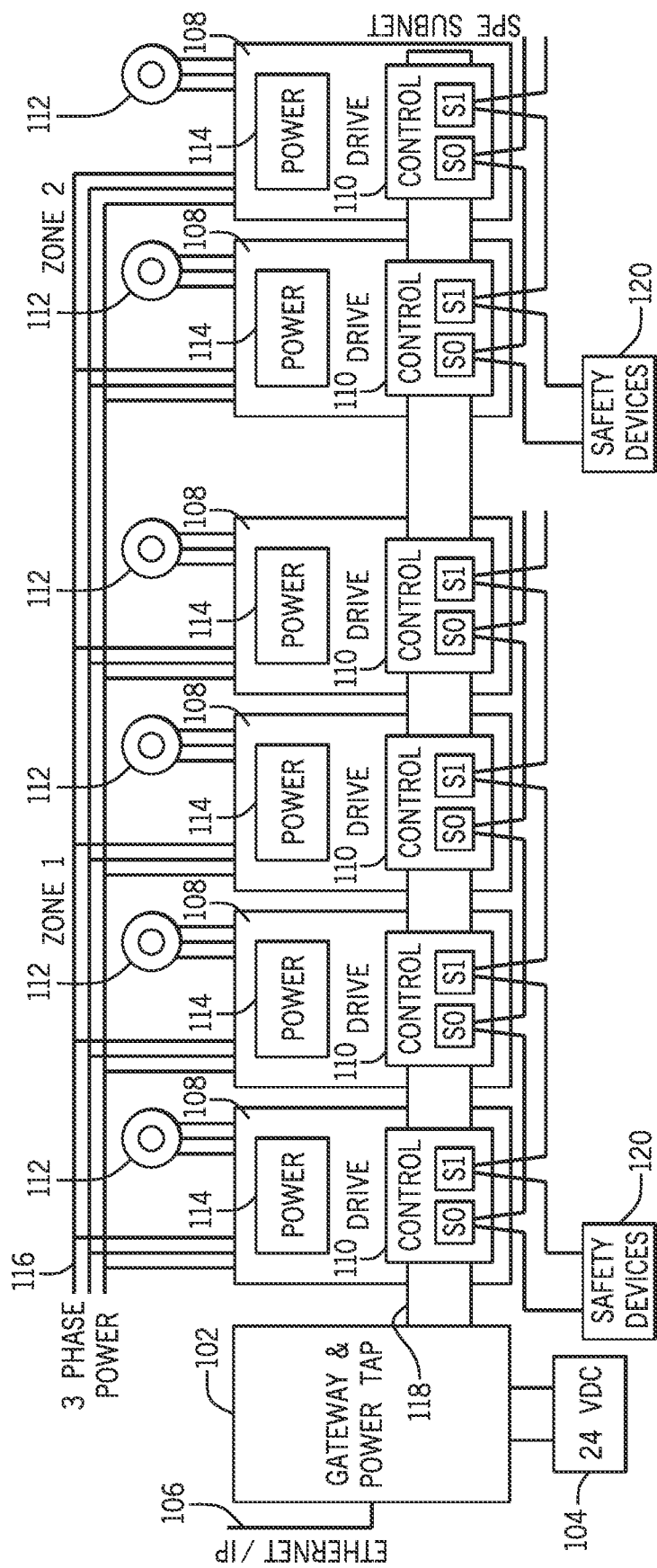
FIG. 2 illustrates a traditional safety configuration for implementing safety control for STO across one or more safety zones, in accordance with an embodiment.

With the foregoing in mind, FIG. 2 illustrates a traditional safety configuration 100 for implementing safety control operations, such as STO operations, for devices across one or more safety zones in the industrial automation system 10. In the example of the safety configuration 100, there are two zones shown: zone one and zone two. In some embodiments, the safety configuration 100 may include more than two safety zones or just one safety zone. The safety configuration 100 may include a gateway 102. The gateway 102 may be a hub for receiving and transmitting network and hardware I/O signals. The gateway 102 may receive power from a power supply 104. The power supply 104 may be a 24 Volt DC source or other suitable voltage source for powering the gateway 102. By way of operation, the gateway 102 may receive control signals from an Ethernet connection 106. The control signals may be received using the Ethernet protocol. The gateway 102 may be communicatively coupled to one or more drives 108, such that each drive 108 may control operations of a respective device in the example industrial automation system 10.

Each drive 108 may include a control system 110. The control system 110 may include a communication component, a processor, a memory, a storage unit, input/output (I/O) ports, an image sensor (e.g., a camera), a location sensor, a display (e.g., HMI), additional sensors (e.g., vibration sensors, temperature sensors), and the like. The communication component may be a wireless or wired communication component that may facilitate communication between the equipment and other communication capable devices.

Each drive 108 may further include a power system 114. The power system 114 may receive power from an industrial power grid 116 that may provide three-phase alternating current (AC) voltage or a direct current (DC) voltage (e.g., three-phase power) to the power system 114. The power system 114 may convert the AC voltage or DC voltage into a controllable AC voltage suitable for powering the respective device controlled by the drive 108. As such, the power system 114 may include a number of switching devices (e.g., transistors, diodes, IGBTs) that may be used to implement a rectifier circuit, an inverter circuit, a variable frequency drive, and the like.

In some instances, the respective devices coupled to the drive 114 may include motors 112. As such, the control system 110 may receive control signals to control operations of the motors 112 via the power system 114. That is, the gateway 102 may receive control signals from other control systems via the Ethernet connection 106 and provides these signals to each control system 114 via a subnet infrastructure 118. In some embodiments, the subnet infrastructure 118 may be implemented via a ribbon cable that includes multiple (e.g., seven) wires. By way of example, the subnet ribbon cable may transmit a select signal, a network power positive signal, a network power negative signal, a control power positive signal, a control power negative signal, and a Single Pair Ethernet (SPE) cable via seven conductors. The select signal may be a sequential service delivery signal that enables each drive 108 to transmit messages sequentially through the other drives 108. In some embodiments, the network power positive signal and negative signal may directly delivery power to the control system 110 of each drive 108 and/or to the network components of the control system 110.

The control power positive signal and negative signal may power certain components (e.g., actuator, a contactor coil) that may be part of the drives 108. An actuator may execute a mechanical control operation for the drive 108. For example, a control operation may include transmitting a control signal to the power system 114 to modify operations of the motor 112, to an actuator of the drive 108 that may perform a mechanical operation, and the like.

Single Pair Ethernet (SPE) may include one pair of conductors facilitate an Ethernet transmission of the data. The SPE conductors may carry a SPE positive signal and a SPE negative signal, which provide for network communication functionality across the subnet infrastructure 118 and each device connected to the subnet infrastructure 118. The SPE positive signal and negative signal may be a part of a bus and/or multi-drop topology (e.g., a topology where multiple data endpoints couple to a same communication bus). Communication transmitted via the SPE conductors may follow a single pair Ethernet protocol. By communicatively coupling the drives 108 and other components via the gateway 102 and the SPE conductors, the present embodiments reduce the size of the communication cables used to interconnect different components via a network and to the Ethernet connection 106 as compared to other communication conductors including the standard Ethernet cables. Moreover, the SPE conductors provide for up to 10 Megabytes/second transmission rate across over 1,000 meters, thereby enabling multiple components to be connected to the gateway 102 via the subnet infrastructure 118.

As discussed above, the subnet infrastructure 118 described above may enable the drive 108 to include advanced safety controls, such as Safe Torque Off (STO) control. To implement these safety controls, the control system 110 of each drive 108 may be coupled to a safety device 120. The safety devices 120 may include safety control systems (e.g., programmable controllers), safety input/output (I/O) modules, and other safety control operational circuitry that provide safety applications to bring automated operations to a safe state (e.g., power down, open circuits) and improve compliance with safety regulations. For example, the safety devices 120 may control the operations of the drives 108 and motors 112 to meet certain Safety Integrated Level (SIL) or a Performance Level (PL) as defined by certain regulations (e.g., IEC 62061, ISO 13849-1). Generally, the safety devices 120 may coordinate the operations of the drives 108, the motors 112, and other devices in the industrial automation system 10 based on detected risk parameters and corresponding control operations that can be implemented to reduce detected risks. The safety devices 120 may be wired to two input ports of the control system 110, S0 and S1. The safety devices 120 may act as a logic solver and provide status updates and shut off commands to the control system via the two input ports. Each input port of the control system 110 is wired to the input ports of an adjacent control system 110, thus creating a network bus for the safety devices 120 to provide commands to an entire zone. Using safety devices 120 to coordinate safety operations of the connected devices add additional cost and consume additional power in the industrial automation system 10. Furthermore, this implementation also involves additional wiring costs to implement due to the connections between the safety devices 120 and the one or more control systems 110. With the foregoing in mind, FIG. 3 is a safety configuration 130 for implementing safety controls (e.g., STO control operations) for devices using network functionality to provide safety controls to the one or more drives 108 or other the devices of the industrial automation system 10.

Similar to the safety configuration 100 of FIG. 2, the safety configuration 130 includes the gateway 102, the power supply 104, the Ethernet connection 106, and one or more drives 108. Each drive 108 may include the control system 110 and the power system 114. Each drive 108 may be communicatively coupled to the motor 112. Further, the power system 114 of each drive 108 may receive three-phase power from the industrial power grid 116. In some embodiments, the network safety controls may be communicated from another communication-enabled device (e.g., local control system 42) via the subnet infrastructure 118 to the control system 110 of each drive 108. That is, the SPE conductors of the subnet infrastructure 118 may transmit I/O connection data 132 and safety connection data 134. The I/O connection data 132 may correspond to the network communication functionality of the SPE conductors described above with respect to FIG. 2.

Additionally, the SPE conductors may transmit the safety connection data 134 to the one or more control systems 110 of the one or more drives 108. The safety connection data 134 may provide commands that correspond to those determined by the safety devices 120. Keeping this in mind, each control system 110 may include one or more safety processors 136 that may perform certain safety operations based on the safety connection data 134. As such, the safety connection data 134 may include status updates and shut off commands that may be processed by the safety processors 136, which may control operations of the respective drive 108 in light of the status updates or shut off commands. For example, in the safety configuration 130, there are two safety processors 136, one connected to the S0 input and the other connected to the S1 input. The safety connection data 134 may include either a logical low or a logical high as inputs for the S0 and the S1 to indicate shut off commands and/or status updates.

Figure 3:
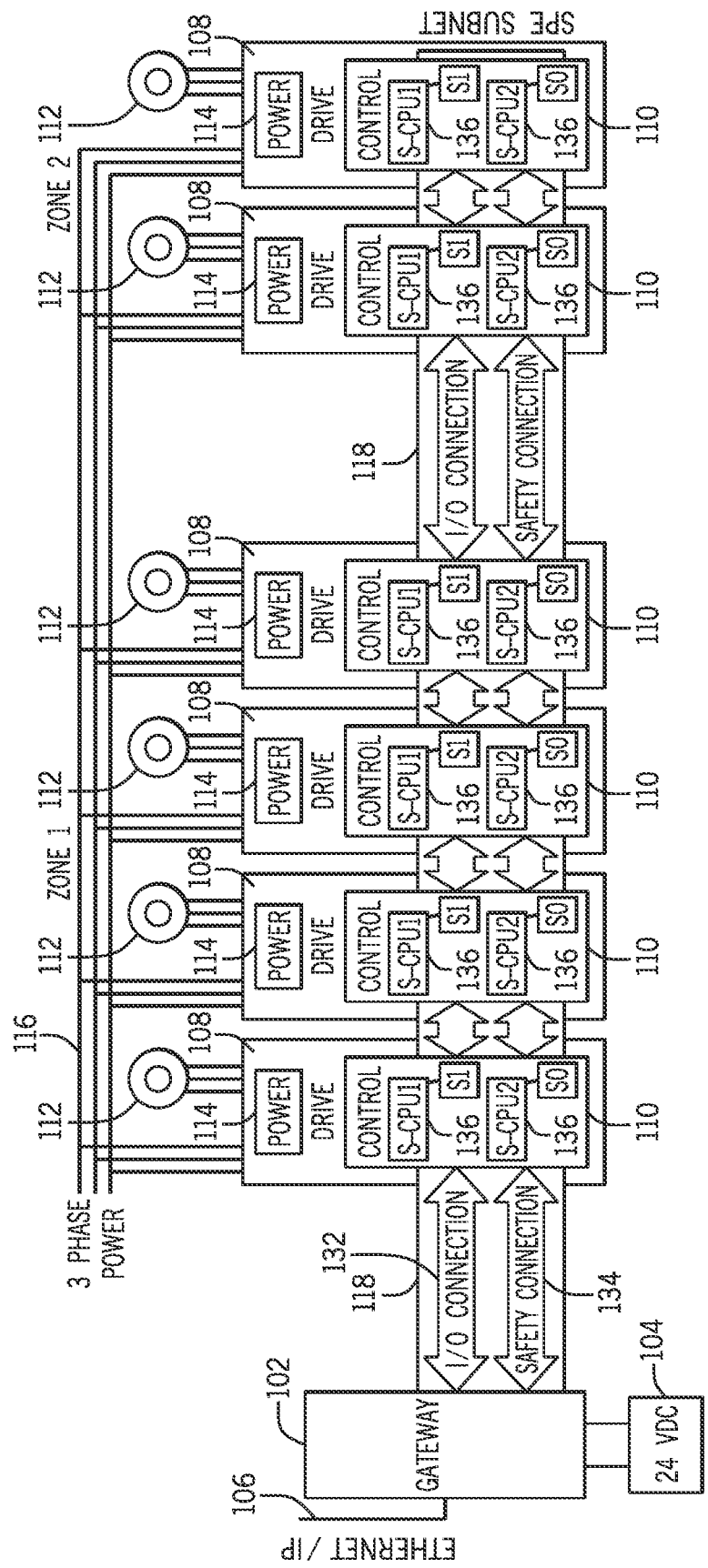
FIG. 3 illustrates a safety configuration of for implementing safety control for STO for devices using network functionality to provide safety controls to the one or more drives of the devices of the industrial automation system, in accordance with an embodiment.
Figure 4:
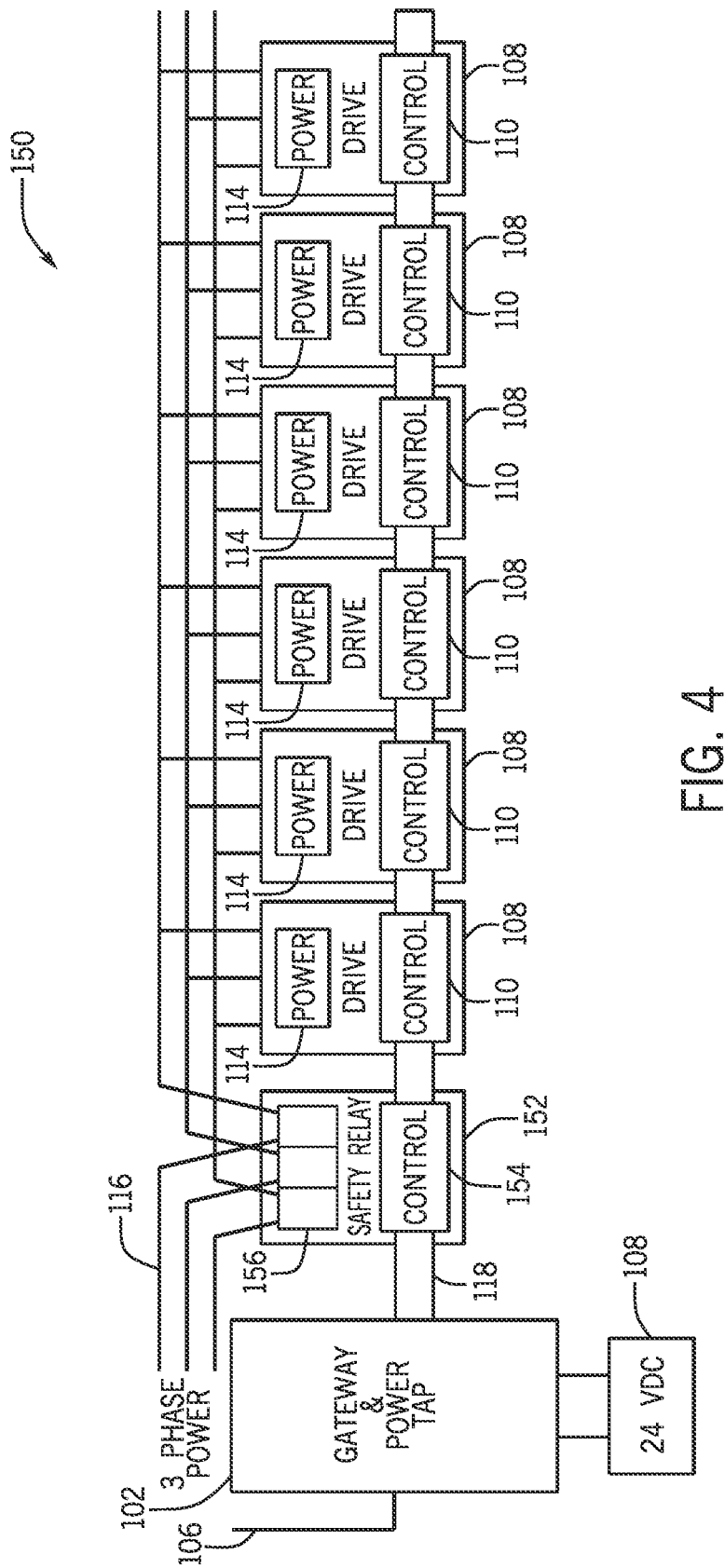
FIG. 4 illustrates a safety configuration including one or more safety relays with embedded safety contactors for implementing safety controls for STO across one or more drives, in accordance with an embodiment.

In addition to the safety configuration 130 of FIG. 3, FIG. 4 illustrates an alternate safety configuration 150 for implementing safety controls across one or more drives. Referring to FIG. 3, the safety configuration 150 may include the gateway 102, the power supply 104, the Ethernet connection 106, and one or more drives 108 similar to the safety configurations 100 and 130. The gateway 102 may utilize Ethernet communication protocol to communicate data. Each drive 108 may include the control system 110 and the power system 114. Each drive may also be communicatively coupled to the motor 112.

The safety configuration 150 may include a safety relay device 152 that is communicatively and electrically coupled to the one or more drives 108. The safety relay 152 may include a network safety control system 154 and one or more safety contactors 156. The safety relay 152 may receive three-phase power from the industrial power grid 116 and distribute the three-phase power to the power system 114 of each driver 108. The network safety control system 154 may include be any suitable control system as described above and implement the safety control operations described above with respect to safety devices 120. The safety contactor 156 may be an electrically controlled switch with one or more states (e.g., closed state, open state) that closes and opens (e.g., switching) an electrical power circuit to enable the connected devices to operate in an on state and an off state. The safety relay 152 may control the one or more states of the safety contactor 156.

In some embodiments, the network safety control system 154 may send command signals to the safety contactor 156 to control the switching of the electrical power circuit based on safety control commands received via the gateway 102 or based on analysis performed by the network safety control system 154. In the implementation of the safety configuration 150, the safety contactor 156 may be attached or enclosed within a housing of the safety relay 152. Moreover, the safety contactor 156 may be directly connected to the industrial power grid 116 upstream of the one or more drives 108. As such, the safety contactor 156 may control the power provided by the industrial power grid 116 to the one or more drives 108.

Figure 5:
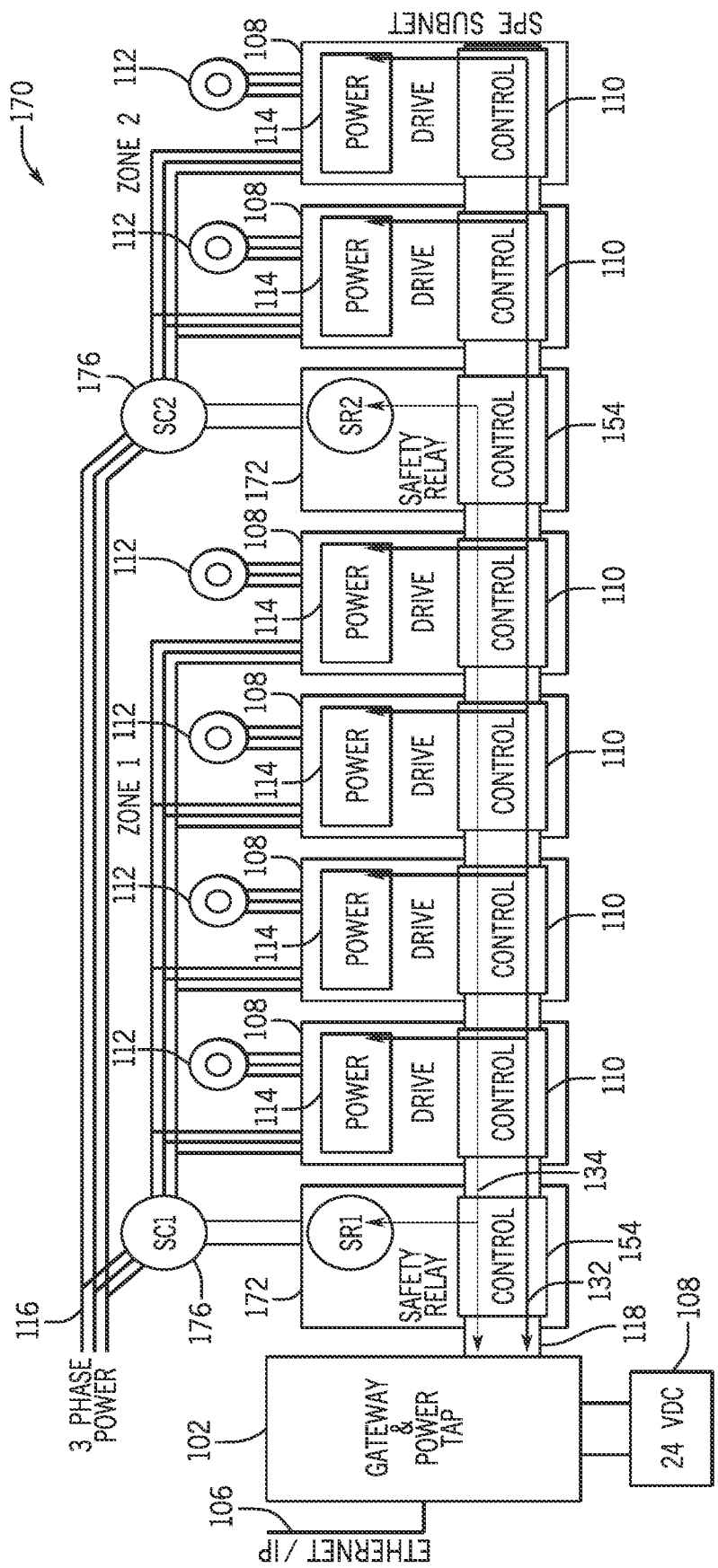
FIG. 5 illustrates a safety configuration including one or more safety relays and one or more external safety contactors for implementing safety controls via network safety, in accordance with an embodiment.

In some embodiments, the safety contactor 156 and the safety relay 152 may be separated into two different devices to provide coverage for one or more safety zones. With the foregoing in mind, FIG. 5 illustrates an alternative safety configuration 170 may include one or more safety relays 172 and one or more external safety contactors 176 for implementing safety controls via a network protocol. The safety relay 172 may include the network safety control system 154 described above and may be communicatively coupled to an external safety contactor 176. In some embodiments, the external safety contactor 176 may be located on or attached to the safety relay 172. The network safety control system 154 may receive the I/O connection data 132 and the safety connection data 134 via the SPE conductors of the subnet infrastructure 118. The external safety contactor 176 may receive three-phase power from the industrial power grid 116 and distribute the three-phase power to the power system 114 of each drive 108.

To avoid the added traffic of transmitting the I/O connection data 132 and the safety connection data 134 to each control system 110 and the network safety control system 154 of each safety relay, the gateway 102 may transmit the safety connection data 134 via the SPE conductors to the network safety control system 154 at each safety relay 172. That is, the gateway 102 may not transmit the safety connection data 134 to each control system 110 to reduce network traffic.

Additionally, the gateway 102 may transmit the I/O connection data 132 via the SPE conductors to the one or more control systems 110. That is, the gateway 102 may not transmit the I/O connection data 132 to the network safety control system 154. In this way, the gateway 102 may reduce the network traffic by selectively sending data to particular types of devices. In some embodiments, the gateway 102 may send both the safety connection data 134 and the I/O connection data 132 to the network safety control system 154, the one or more control systems 110, or both.

After receiving the safety connection data 134 via the SPE conductors, the network safety control system 154 may send command signals to the connected external safety contactor 176 to enable/disable power coming from the industrial power grid 116. In some embodiments, each zone may include one or more safety relays 172 connected to one or more respective external safety contactors 176. By way of example, one zone may include one safety relay 172 controlling one external safety contactor 176, while another zone may include one safety relay 172 controlling multiple external safety contactors 176. Safety relays 172 may connect and control multiple different types of contactors, such as, but not limited to, electrical contactors and magnetic contactors.

Using the safety relay 172 to control each external safety contactor 176, may involve additional hardware installation and unnecessary power consumption. Additionally, each safety relay 172 may need to change the incoming voltage from the gateway 102 to control each external safety contactor 176 safely. To overcome this, the safety relay 172 may be removed from the configuration entirely and the safety controls to control the external safety contactors 176 may be implemented via network communication.

Figure 6:
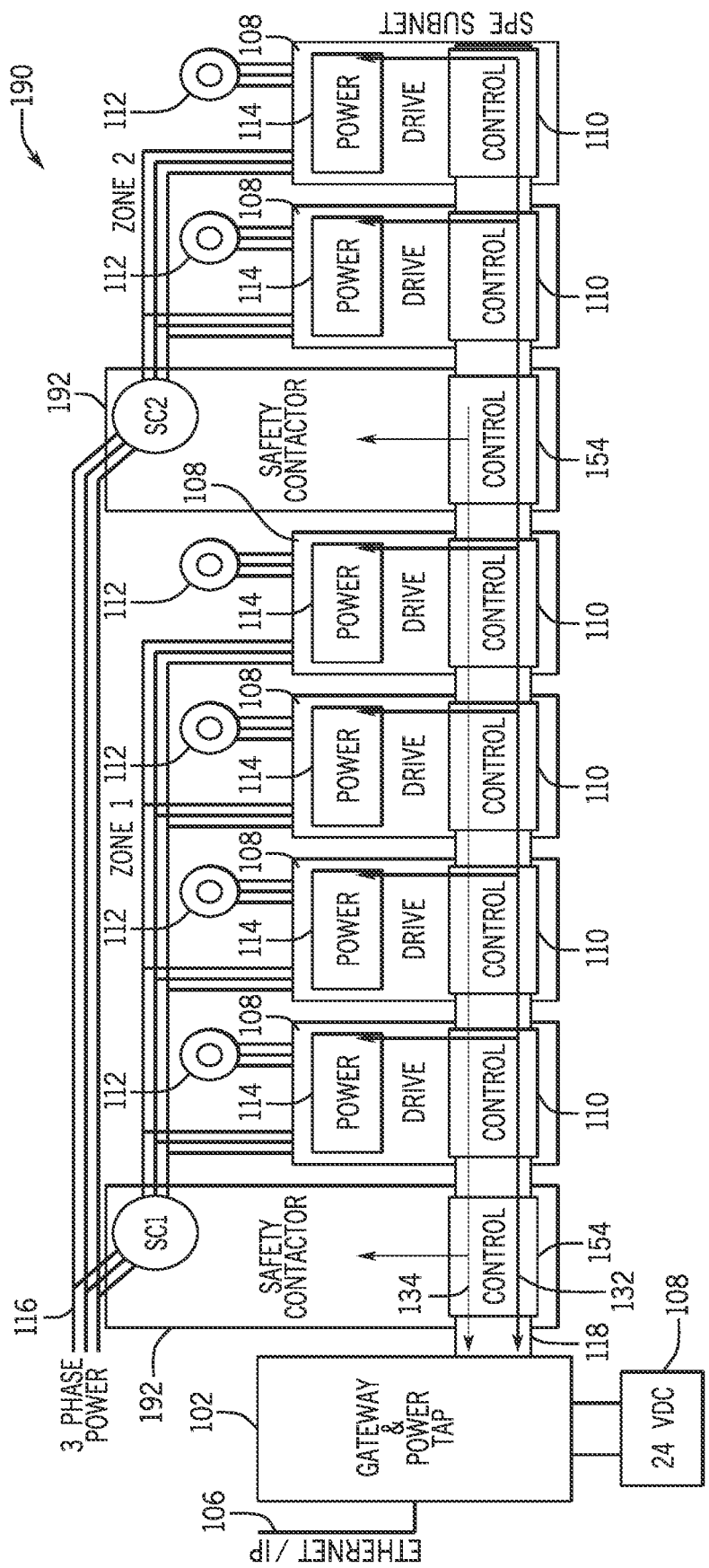
FIG. 6 illustrates a safety configuration including one or more independent safety contactors for implementing safety controls via a network safety system, in accordance with an embodiment.

With the foregoing in mind, FIG. 6 illustrates a safety configuration 190 including one or more independent safety contactors 192 for implementing safety controls via network safety. The independent safety contactors 192 may include the network safety control system 154 which receives the safety connection data 134 from the gateway 102. The independent safety contactor 192 may receive three-phase power from the industrial power grid 116 and distribute the three-phase power to the power system 114 of each drive 108.

Similar to the safety configuration 170 illustrated by FIG. 5, the gateway 102 may selectively transmit the safety connection data 134 via the SPE conductors to the network safety control system 154 and the gateway 102 may transmit the I/O connection data 132 via the SPE conductors to the control system 110 of each drive 108. That is, the gateway 102 may not transmit the I/O connection data 132 to the network safety control system 154. The network safety control system 154 for each independent safety contactor 192 may directly control each respective independent safety contactor 192 and control the transmission of the three-phase power to each drive 108 within each zone. In some embodiments, the status of the independent safety contactors 192 is monitored over the network via the subnet infrastructure 118 by the local control system 42.

The safety contactor 192 may be a safety solid-state device which removes the 3-phase power 116 from the variable frequency drives 108. The solid-state device may be integrated with the network safety control system 154 to ensure that the requirements of the safety standards are met. Additionally, feedback from the solid-state device may be discarded due to the internal diagnostic provided by the network safety control system 154. When the safety contactor 192 is enabled, feedback from the safety contactor 192 may be integrated into the safety control system 154 and the status may be made available from the safety connection 134.

In some embodiments, the additional hardware of the safety relays 172 and the independent safety contactors 192 may be removed for safety controls to be implemented via the subnet infrastructure 118. That is, the driver 108 may receive monitoring signals via the SPE conductors to perform actions similar to the safety relay 172 and the independent safety contactors 192.

Figure 7:
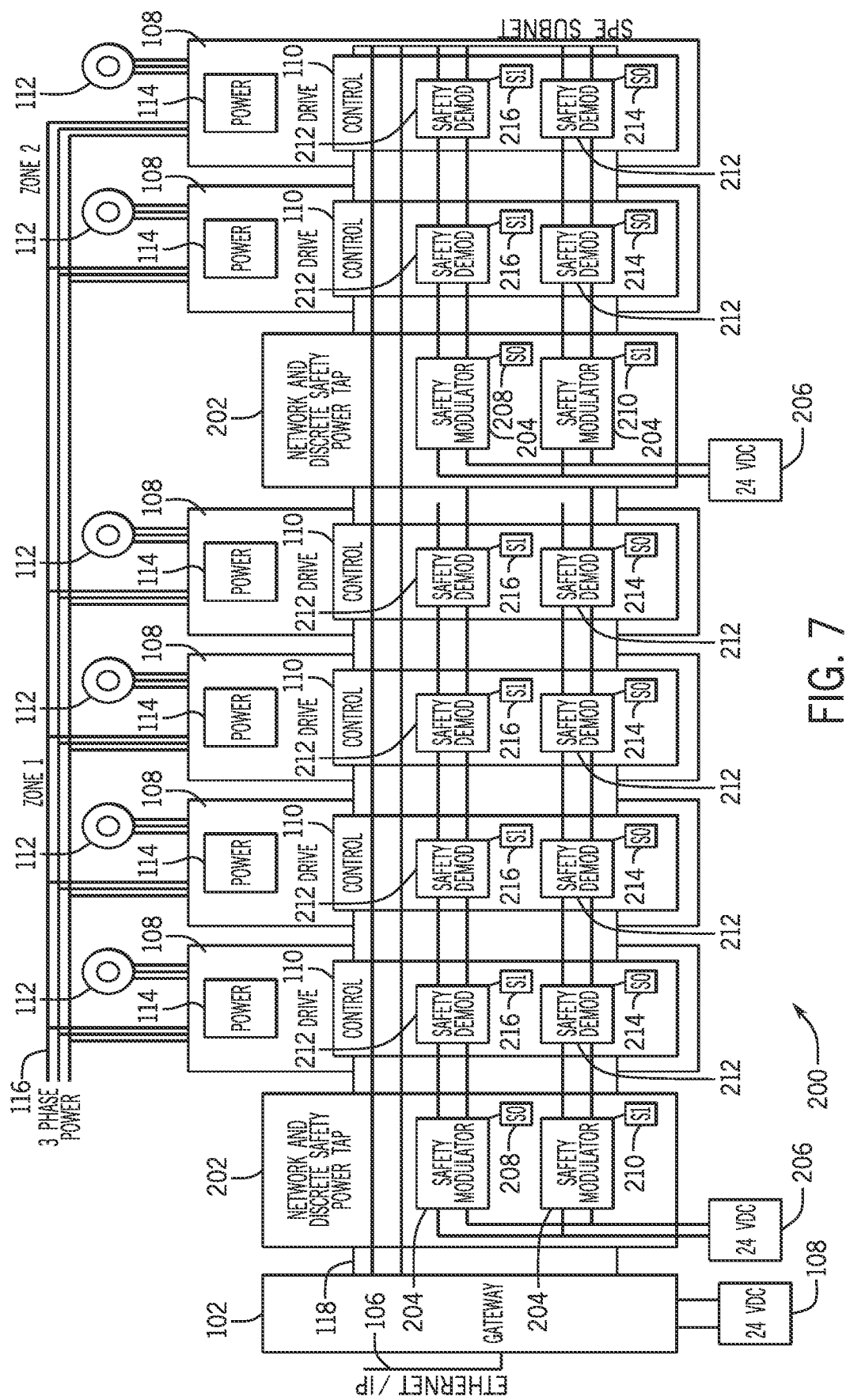
FIG. 7 illustrates a safety configuration for implementing safety controls via a network safety power tap, in accordance with an embodiment.

With the foregoing in mind, FIG. 7 illustrates a safety configuration 200 for implementing safety controls via a network safety power tap 202. The network safety power tap 202 connected to the subnet infrastructure 118 may be coupled between the gateway 102 and each drive 108 of a safety zone. The network safety power tap 202 may include one or more safety modulators 204 connected to a power supply 206, where the one or more safety modulators 204 modulates a signal received from the power supply 206 based on an input provided via a S0 input 208 and a S1 input 210 at the network safety power tap 202. The S0 input 208 may represent the operational status of the control power supply and the S1 input 210 may represent the operational status of the network power supply, where the presence of a logical high in both the S0 input 208 and the S1 input 210 may indicate functional operation and modulation proceeds. The signal received from the power supply 206 may be distributed as network and control waveforms (e.g., signal) that may be modulated via Single Carrier Modulation, such as Amplitude Shift Keying, Frequency Shift Keying, Phase Shift Keying, and Orthogonal Amplitude Modulation, and/or Multicarrier Modulation, such as Orthogonal Frequency Division Multiplexing. The modulated signals may be supplied via the subnet ribbon cable along the subnet infrastructure 118 to each drive 108. In some embodiments, the control power signals and the network power signals may each have a carrier signal to facilitate normal operation and the safety modulator 204 may modulate that carrier signal. In some embodiments, each network safety power tap 202 may cover a zone per power tap. As such, each power supply (e.g., network power signals/control power signals) may be different between zones and different zones of safety may be constructed with the one or more power supplies.

If each power signal (e.g., network power signal, control power signal) is operating correctly, a safety circuit of the network safety power tap 202 is closed independently for both a S0 input 208 and a S1 input 210 (e.g., when S0 and S1 are both set to a logical high). In some embodiments, the S0 input 208 and the S1 input 210 may operate on negative logic, where a logical low indicates that normal operation may continue. In any case, if an error is detected at the network safety power tap 202, either at the S0 input 208 or at the S1 input 210, the safety modulator 204 may stop modulating the respective signal. In some embodiments, after detecting the error state at the S0 input 208 or at the S1 input 210, the control system 110 of each drive 108 may engage the STO control operation. That is, the control system 110 may not detect an expected modulation on carrier signal (e.g., at expected frequency) via a safety demodulator 212 and may send a command to the power system 114 or other suitable device to engage the STO control operation.

In some embodiments, each control system 110 may include safety demodulators 212, where each safety demodulator 212 is connected to the network power and/or the system power supply via the subnet infrastructure 118. The safety demodulator 212 demodulates the incoming modulated waveform and may identify any disturbance in modulation of the modulated carrier signals that correspond to the network power signals and/or the control power signals. A detected disturbance may cause the safety circuit to open and flip the bit of a S0 input 214 and/or a S1 input 216 of the control system 110. In response to the safety circuit opening, the control system 110 may engage in the STO control operations. Upon the safety circuit of the drive 108 at the beginning of a chain of drives 108 opening, the safety circuits of the remaining drives 108 in the chain open and subsequently cause the respective control system 110 to engage the STO control operations. In the control system 110, the S0 input 214 may control an enable bit for a safety control chip located within the control system 110 and the S1 input 216 may control the operation of the safety control chip.

Figure 8:
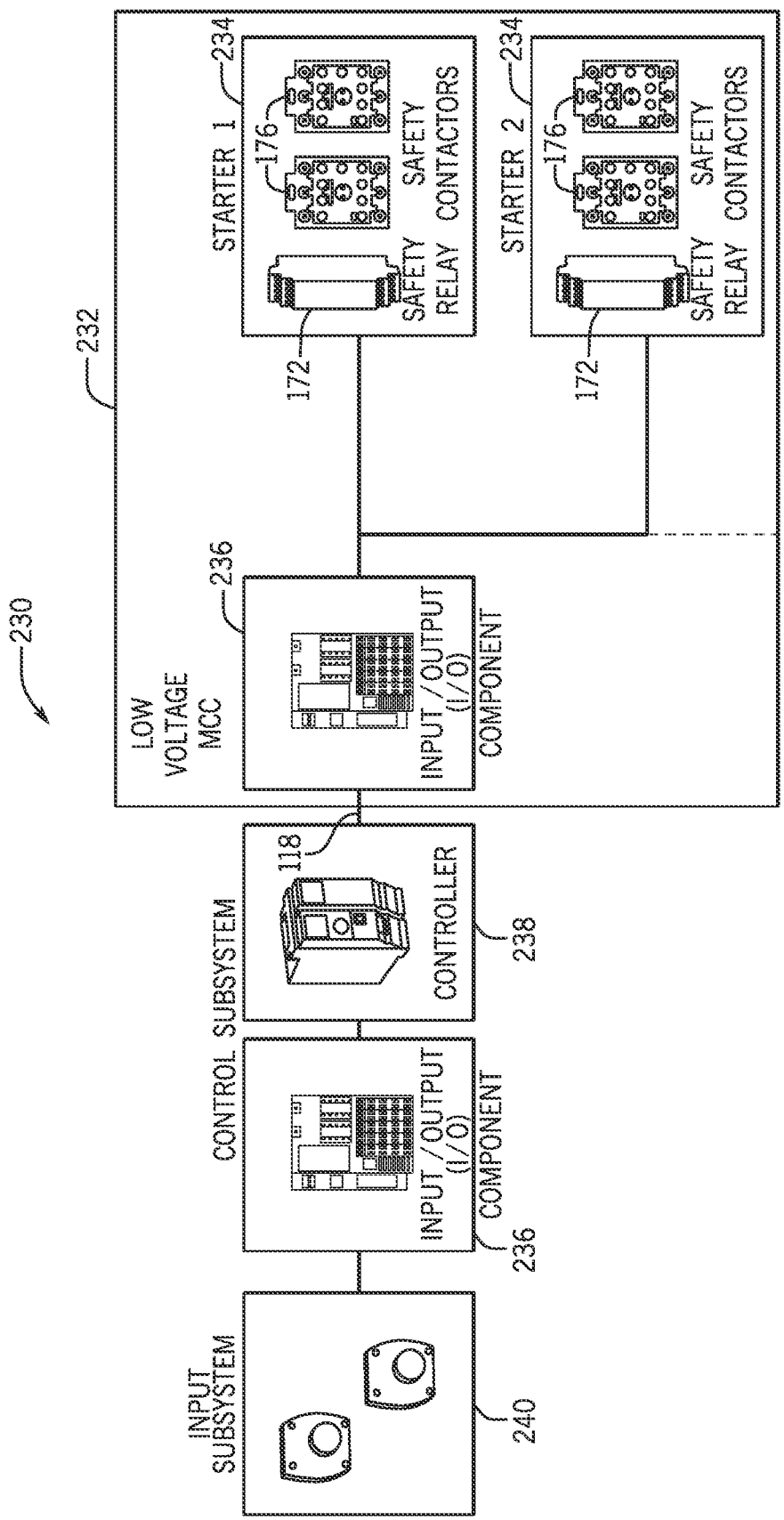
FIG. 8 illustrates an example subsystem of the industrial automation system with hardwired safety controls, in accordance with an embodiment.

The drives 108 may be implemented into the example industrial automation system 10 as subsystems with multiple safeguards. As seen in FIG. 8, an illustration 230 shows an example subsystem of the example industrial automation system 10 with hardwired safety controls. A Motor Control Center (MCC) 232 may include one or more starters 234. The starters 234 may include one or more safety relays 172 and one or more safety contactors 176. Different types of the starters 234 may include Low Voltage Soft Starters, Medium Voltage Soft Starers, and/or Low Voltage Starters, each which may start and monitor the motors 112 and drives 108 of the example industrial automation system 10.

The starters 234 may be communicatively coupled to an I/O Component 236. The I/O Component 236 may safeguard the equipment of the example industrial automation system 10 and serve as a safety distribution unit across one or more safety zones, where the I/O Component 236 monitors the equipment within its respective safety zones and sends critical safety information related to the equipment to the local control system 42. A control subsystem may be communicatively coupled to the MCC 232, where the control subsystem may include another I/O Component 236 and a controller 238. The controller 238 may be a processor that controls one or more safety devices (e.g., the I/O component 236, the safety relay 172, and/or the safety contactors 176). The control subsystem is communicatively coupled to an input subsystem 240, which may include emergency stop pushbuttons as a manual overriding safety feature to shut down the entire system.

Figure 9:
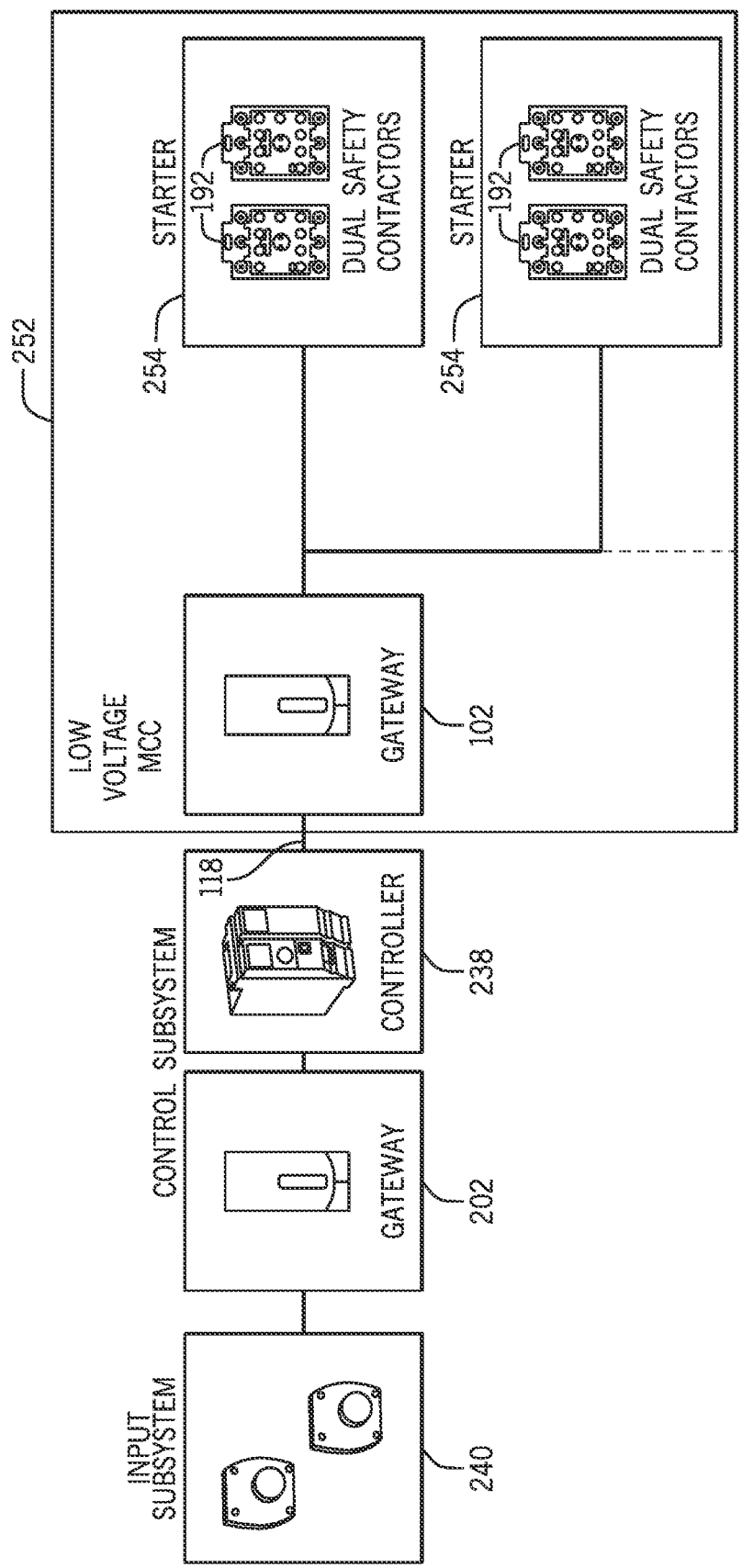
FIG. 9 illustrates an example subsystem of the industrial automation system with network safety implemented, in accordance with an embodiment.

The subnet infrastructure 118 and the SPE conductor may serve functionality outside of drive application safety control. That is, network safety may be implemented into larger systems and control network safety for more devices outside of drivers 108. With the foregoing in mind, FIG. 9 is an illustration 250 showing a subsystem of the example industrial automation system 10 with network safety implemented.

A Motor Control Center (MCC) 252 may include one or more starters 254. The starters 254 may include one or more safety contactors 192. Different types of the starters 254 may include Low Voltage Soft Starters, Medium Voltage Soft Starers, and/or Low Voltage Starters, each which may provide voltage to and monitor the motors 112 and drives 108 of the example industrial automation system 10. The starters 254 may include one or more safety contactors 192. The starters 254 are communicatively coupled to a gateway 102, which facilitates a connection between the subnet infrastructure 118 (and the internal SPE conductors) and the starters 254. The gateway 102 located within the MCC 252 may replace the functionality of the I/O component 236 within the MCC 232 and the safety relay 172. That is, the gateway 102 located within the MCC 252 may control the one or more states of the one or more safety contactors 192 by transmitting the safety connection data directly to the one or more safety contactors. The starters 254 may use the network safety controls described in FIG. 6.

The gateway 102 may be communicatively coupled to the external control subsystem, where the external control subsystem includes the controller 238. The controller 238 may be further communicatively coupled to the gateway 102. The gateway 102 external of the MCC 252 may replace the functionality of the I/O component 236 that is communicatively coupled to the MCC 232. That is, the gateway 102 external of the MCC 252 may selectively transmit the safety connection data and the I/O connection data to the MCC 252. The gateway 102 is further communicatively coupled with the input subsystem 240. The input subsystem 240 may include the emergency stop pushbuttons as a manual overriding safety feature to shut down the entire system. As such, unnecessary and expensive hardware is removed, and a network safety infrastructure may be implemented in its place at a lower cost.

By employing the techniques described in the present disclosure, the systems described herein may allow for implementing low-cost and zoned safety features into the industrial drive applications using SPE. The gateway 102 may provide a connection between the safety relays 172, the independent safety contactors 192, and/or the network safety power tap 202 and the drives 108 via the subnet infrastructure 118 with the SPE cable to facilitate network-based safety features. Indeed, monitoring the modulation of power supplies to the control systems 110 of the drives 108 may allow for low-cost network safety implementations and will lead to a wide array of improvements within the automation industry.

While only certain features of the present disclosure have been illustrated and described herein, many modifications and changes will occur to those skilled in the art. It is therefore, to be understood that the appended claims are intended to cover all such modifications and changes as fall within the true spirit of the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed:

1. A system, comprising:
   one or more drives configured to receive a first alternative current (AC) voltage from a power source and provide a second AC voltage to one or more load devices;
   one or more safety relay devices configured to couple the power source to the one or more drives;
   a communication device comprising a processor configured to:
      receive a first dataset via an Ethernet communication protocol, wherein the first dataset comprises safety connection data indicative of one or more safety commands for controlling one or more operations of the one or more safety relay devices; and
      transmit a second dataset to the one or more safety relay devices via a subnet infrastructure, wherein the second dataset comprises the one or more safety commands, wherein the subnet infrastructure comprises a plurality of conductors, wherein two of the plurality of conductors are configured to implement a single pair Ethernet (SPE) protocol.

2. The system of claim 1, wherein the plurality of conductors comprises seven conductors.

3. The system of claim 1, wherein the plurality of conductors is integrated in ribbon cable.

4. The system of claim 1, wherein the plurality of conductors is configured to couple to each of the one or more safety relay devices and each of the one or more drives.

5. The system of claim 1, wherein each of the one or more safety relay devices comprises one or more contactors configured to couple or uncouple the power source to the one or more drives.

6. The system of claim 1, comprising one or more contactors configured to couple the power source to the one or more drives, wherein the one or more safety relay devices is configured to control one or more states of the one or more contactors.

7. A system, comprising:
   one or more drives configured to receive a first alternative current (AC) voltage from a power source and provide a second AC voltage to one or more load devices;
   one or more contactors configured to couple the power source to the one or more drives;
   a communication device comprising a processor configured to:
      receive a first dataset via an Ethernet communication protocol, wherein first dataset comprises safety connection data indicative of one or more safety commands for controlling one or more operations of the one or more contactors; and
      transmit a second dataset to the one or more contactors via a subnet infrastructure, wherein the second dataset comprises the one or more safety commands, wherein the subnet infrastructure comprises a plurality of conductors, wherein two of the plurality of conductors are configured to implement a single pair ethernet protocol, and wherein the plurality of conductors is integrated in ribbon cable.

8. The system of claim 7, wherein the plurality of conductors is configured to couple to each of the one or more contactors and each of the one or more drives.

9. The system of claim 7, wherein the processor is configured to:
   receive a status of each of the one or more contactors via the subset infrastructure; and
   transmit the status of each of the or more contactors to one or more control systems via the Ethernet communication protocol.

10. The system of claim 7, comprising a network component, wherein the network component comprises one or more modulators configured to:
    receive a signal;
    generate a modulated signal by modulating the signal based on an additional status of a safety circuit; and
    transmit the modulated signal via a first conductor of the plurality of conductors.

11. The system of claim 10, wherein the signal is associated with a network power signal, a control power signal, or both.

12. The system of claim 10, wherein each of the one or more drives comprises one or more demodulators, wherein each of the one or more demodulators is configured to:
    receive the modulated signal via the first conductor;
    generate a demodulated signal based on the modulated signal;
    upon detecting a presence of a carrier signal in the demodulated signal, maintain a first state of a respective safety circuit of a respective one of the one or more drives;
    upon not detecting the presence of the carrier signal with the first carrier frequency in the first demodulated signal, modify the first state of the respective safety circuit of the respective one of the one or more drives.

13. The system of claim 11, wherein the respective one of the one or more drives comprises a control system configured to initiate one or more safety protocols in response to the first state being modified.

14. A system, comprising:
    one or more drives configured to receive a first alternative current (AC) voltage from a power source and provide a second AC voltage to one or more load devices;

one or more contactors configured to couple the power source to the one or more drives;
one or more safety relay devices communicatively coupled to the one or more contactors and configured to control the one or more contactors;
a network component comprising one or more modulators configured to:
receive a signal;
generate a modulated signal by modulating the signal based on a status of a safety circuit; and
transmit the modulated signal via a single-pair Ethernet (SPE) conductors;
a communication device comprising a processor configured to:
receive a first dataset via an Ethernet communication protocol, wherein the first dataset comprises safety connection data indicative of one or more safety commands for controlling one or more operations of the one or more safety relay devices; and
transmit a second dataset to the one or more safety relay devices via the SPE conductors, wherein the second dataset comprises the one or more safety commands.

15. The system of claim 14, wherein the SPE conductors corresponds to a first conductor and a second conductor of a plurality of conductors, wherein a third conductor and a fourth conductor of the plurality of conductors are configured to provide network power, wherein a fifth conductor and a sixth conductor of the plurality of conductors are configured to provide control power, and wherein the plurality of conductors is integrated in a ribbon cable.

16. The system of claim 14, wherein the signal is associated with a network power signal, a control power signal, or both.

17. The system of claim 14, wherein the one or more safety relay devices are configured to control one or more states of the one or more contactors.

18. The system of claim 14, wherein the processor is configured to:
receive an additional status of each of the one or more contactors from a respective safety relay device; and
transmit the additional status of each of the or more contactors to one or more control systems via the Ethernet communication protocol.

* * * * *